United States Patent Office  2,932,634
Patented Apr. 12, 1960

2,932,634

PROCESS OF PRODUCING PEPTIDES AND PRODUCTS OBTAINED THEREBY

Gaston Amiard, Noisy-le-Sec, René Heymes, Romainville, and Leon Velluz, Paris, France, assignors to UCLAF, Paris, France, a body corporate of France No Drawing. Application June 27, 1956
Serial No. 594,106

Claims priority, application France July 1, 1955

11 Claims. (Cl. 260—112)

This invention relates to a new method of preparing peptides.

In the copending application Serial No. 527,634, of August 10, 1955, entitled Process of Producing Peptides and Products Obtained Thereby, of which this application is a continuation-in-part, a method has been described of preparing peptides by producing first as an intermediary the corresponding N-trityl peptide. More specifically, the method consists in preparing an N-trityl α-amino acid, converting it into a mixed anhydride and reacting the latter with an α-amino acid or peptide ester. This condensation product is saponified in order to liberate the carboxy group and is then detritylated by heating with aqueous acetic acid.

However, this process is not applicable in connection with certain N-trityl α-amino acids, such as N-trityl methionine, N,N'-ditrityl histidine and N-trityl tryptophane, since mixed anhydrides of these compounds cannot be condensed with α-amino acid or peptide esters according to the aforesaid method.

We have now discovered that N-trityl α-amino acids in general, including the three foregoing N-trityl α-amino acids, can be readily converted into peptides by reacting them with α-amino acid or peptide esters in the presence of dicyclohexylcarbodiimide. The free peptides are obtained by saponifying and detritylating in the manner disclosed in the said copending application.

It is, therefore, an object of this invention to provide a new method of preparing peptides, which are of great importance in nutrition and in protein research.

Moreover, it is a particular object of the invention to provide a new and practical method of preparing peptides which comprise methionine, histidine, or tryptophane in their molecules.

The herein-claimed process is of particular interest in connection with the preparation of peptides comprising histidine or methionine, representatives of which have not been investigated to any great extent. Economically speaking, it is the best method of obtaining peptides comprising tryptophane because, after participating in the formation of N-trityl-tryptophane, trityl chloride is recovered at practically quantitative yields in the form of triphenyl-carbinol upon detritylation according to the copending application.

In order to carry out the process, lower alkyl esters of α-amino acids or peptides having free amino groups are dissolved in a solvent such as methylene chloride or chloroform. A solution of dicyclohexylcarbodiimide in the same solvent is added and the desired N-tritylated α-amino acid is introduced. After the reaction mixture has been left standing overnight or longer, an almost quantitative precipitation of dicyclohexylurea may be observed which is completed upon addition of a small amount of acetic acid designed to transform the excess dicyclohexylcarbodiimide into the corresponding urea. Having removed the dicyclohexylurea by filtration, the solution containing the trityl-peptide ester is evaporated to a dry residue which, after saponification and detritylation with hot aqueous acetic acid, yields the desired peptide.

The melting points given in the following examples are instantaneous melting points determined by means of the heated block method.

EXAMPLE 1

*Preparation of N-trityl-DL-methionylglycine*

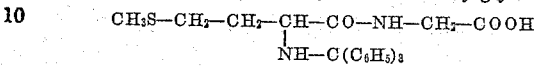

(a) *Ethyl glycinate.*—3 g. of ethyl glycinate hydrochloride, obtained by esterification of glycine with alcoholic hydrochloric acid, are suspended in 6 cc. of chloroform, and 2 cc. of diethyl amine are added. 10 cc. of ether are added in order to precipitate diethyl amine hydrochloride. The solution is left standing for 15 minutes, the diethyl amine hydrochloride is filtered off, and the ether-chloroform solution of ethyl glycinate is evaporated to dryness.

(b) *Condensation of N-trityl DL-methionine with ethyl glycinate in the presence of dicyclohexylcarbodiimide.*—1.1 g. of ethyl glycinate obtained according to (a) are dissolved in 3 cc. of methylene chloride, to which is added a solution of 2.5 g. of dicyclohexylcarbodiimide in 5 cc. of methylene chloride. After cooling the solution to 0° C., 3.9 g. of N-trityl-DL-methionine are added, the preparation of which has been described in the aforementioned copending application. This solution is left standing overnight at room temperature. The following day, 0.5 cc. of acetic acid are added, the solution is left undisturbed for several minutes and the dicyclohexylurea which precipitates is filtered off. The filtered solution is first washed with normal hydrochloric acid, then with water and ammonia, and again with water until neutral. It is then dried over magnesium sulfate and evaporated to dryness. The residue represents crude ethyl N-trityl-DL-methionylglycinate containing some methylene chloride. The yield is equal to the theoretical yield.

(c) *Saponification of ethyl N-trityl-DL-methionylglycinate.*—The crude product obtained according to (b) is freed from methylene chloride by dissolving in alcohol and distilling off part of the latter. 8 cc. of a 20% solution of potassium hydroxide in methanol and 2 cc. of water are added to the alcohol solution and the mixture is boiled for 5 minutes. After diluting with water, cooling, and acidifying with acetic acid, the desired tritylpeptide separates in form of an oily precipitate which is purified by dissolving in chloroform and washing the chloroform solution with water. After drying over sodium sulfate and evaporating the solvent, pure N-trityl-DL-methionylglycine is obtained in form of a heavy oil.

EXAMPLE 2

*Preparation of DL-methionylglycine by detritylation of N-trityl-DL-methionylglycine*

Crude N-trityl-peptide obtained according to Example 1(c) is dissolved in 10 cc. of acetic acid. 10 cc. of water are added, and the solution is heated in a boiling water bath. After several minutes of heating, triphenylcarbinol crystallizes while the peptide remains dissolved. The heating is discontinued, water is added, and the triphenylcarbinol is separated and washed with water. The filtrate is concentrated to small volume, treated with charcoal and concentrated until crystallization commences. After adding 20 cc. of absolute alcohol, precipitated solids are separated, washed with alcohol and dried. This produces 1.5 g. of DL-methionylglycine, having a melting point of 240–245° C. (decomposition), which is identical with the DL-methionylglycine of the

EXAMPLE 3

*Preparation of N-trityl-DL-tryptophylglycine*

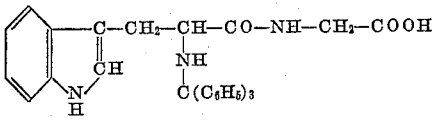

(a) *Ethyl glycinate.*—This product is prepared according to Example 1(a).

(b) *Condensation of N-trityl-DL-tryptophane with ethyl glycinate in the presence of dicyclohexylcarbodiimide.*—The procedure of Example 1(b) is closely followed except that to 1.1 g. of ethyl glycinate 4.46 g. of N-trityl-DL-tryptophane are added, obtained according to the process used in the preparation of N-tritylmethionine. After the removal of methylene chloride by evaporation, 4.25 g. of crude ethyl N-trityl-DL-tryptophylglycinate (or a yield of 80%) are obtained. The product crystallizes upon taking up with alcohol. For purposes of analysis, the product is recrystallized in toluene. The melting point is 203° C. This new product is soluble in chloroform and acetone, difficultly soluble in alcohol and ether, insoluble in water.

Analysis: $C_{34}H_{33}O_3N_3 = 531.63$. Calculated: 76.81% C; 6.26% H; 9.03% O; 7.90% N. Found: 77.1% C; 6.3% M; 8.9% O; 7.9% N.

(c) *Saponification of ethyl N-trityl-DL-tryptophylglycinate.*—The process is carried out in the same manner as in Example 1(c), using for 2 g. of the ester 5 cc. of a 20% potassium hydroxide solution in methanol and 1 cc. of water. The solution is acidified with acetic acid after having been diluted with water. N-trityl-DL-tryptophylglycine precipitates in the form of a powder.

EXAMPLE 4

*Preparation of DL-tryptophylglycine by detritylation of N-trityl-DL-tryptophylglycine*

The process of Example 2 is followed, using in connection with the product obtained according to Example 3(c) 10 cc. of a 50% acetic acid. After removing triphenylcarbinol, concentrating the filtrate and adding alcohol, 880 mg. of hydrated DL-tryptophylglycine are obtained, having a melting point of 170° C., which is identical with DL-tryptophylglycine of the literature.

EXAMPLE 5

*Preparation of N,N-ditrityl-L-histidylglycine*

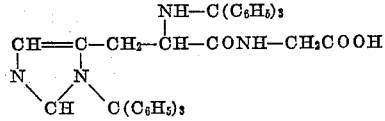

(a) *Ethyl glycinate.*—This product is prepared according to Example 1(a).

(b) *Condensation of N,N'-ditrityl-L-histidine with ethyl glycinate in the presence of dicyclohexylcarbodiimide.*—The procedure of Example 1(b) is closely followed except that to 1.1 g. of ethyl glycinate, 6.4 g. of N,N'-ditrityl-L-histidine are added, which is prepared according to the process described for N-trityl-methionine. After the evaporation of the solvent, a theoretical yield of crude ethyl ester of N,N'-ditrityl-L-histidylglycine is obtained in form of an oil.

(c) *Saponification of ethyl N,N'-ditrityl-L-histidylglycinate.*—The procedure of Example 1(c) is followed, using for the entire quantity of crude ester obtained according to Example 5(b) 10 cc. of a 20% potassium hydroxide solution in methanol and 2 cc. of water. The solution is acidified with acetic acid after dilution with water. The pulverulent product which precipitates is separated, washed with water and dried. It is purified by recrystalizing in 20 cc. of toluene. N,N'-ditrityl-L-histidyl-glycine crystallizes in the form of large, hydrated prisms. Washing with toluene and drying at 110° C. results in 5.6 g. (or a yield of 80%) of analytically pure N,N'-ditrityl-L-histidyl-glycine, having a melting point of 155–160° (with effervescence), $$[\alpha]_D^{20} = +17° \pm 1 (c. = 2\% \text{ chloroform})$$

This new product is soluble in acetone and chloroform, difficultly soluble in alcohol, ether and aqueous diluted alkalis and insoluble in alcohol, ether and aqueous diluted alkalis and insoluble in water.

Analysis: $C_{46}H_{40}O_3N_4 = 696.81$. Calculated: 79.28% C; 5.79% H; 6.89% O; 8.04% N. Found: 79.5% C; 6.0% H; 6.7% O; 7.9% N.

EXAMPLE 6

*Preparation of L-histidylglycine by detritylation of N,N'-ditrityl-L-histidyl-glycine*

Following the procedure of Example 2, for 4 g. of the product obtained according to 5(c), 10 cc. of 50% aqueous acetic acid are used. After separating triphenylcarbinol, the filtrate is concentrated, and alcohol is added to crystallize the peptide. Upon filtering, washing with alcohol and drying, 1.2 g. of L-histidyl-glycine hemihydrate are obtained, having a melting point of approximately 190° C. (unsharp), $$[\alpha]_D^{20} = +25° \pm 1 (c. = 2\%, \text{ water}).$$

(The rotary power given relates to the anhydrous product.)

The determination of the water content according to Fischer indicates that the new product comprises 0.62 mol of water. It is insoluble in water and in aqueous diluted acids and alkalies, insoluble in alcohol and ether.

Analysis: $C_8H_{12}O_3N_4$, 0.62 $H_2O = 223.4$. Calculated: 43.0% C; 5.97% H; 25.9% O; 25.08% N. Found: 43.3% C; 6.1% H; 25.6% O; 24.9 N.

EXAMPLE 7

*Preparation of N,N'-ditrityl-L-histidyl-L-leucine*

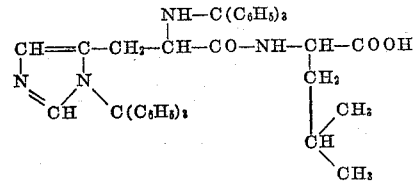

(a) *Preparation of methyl leucinate.*—1.6 g. of methyl leucinate are prepared from its hydrochloride according to the technique described in Example 1(a) for ethyl glycinate.

(b) *Condensation of N,N'-ditrityl-L-histidine with methyl L-leucinate in the presence of dicyclohexylcarbodiimide.*—The procedure of Example 1(b) is followed, using for 1.6 g. of methyl L-leucinate, 6.4 g. of N,N'-ditrityl-L-histidine and 2.5 g. of dicyclohexylcarbodiimide. The reaction mixture is left standing for two days at room temperature. After evaporation of the solvent the theoretical yield of the methyl ester of crude N,N'-ditrityl-L-histidyl-L-leucine is obtained, which is a semisolid product showing no tendency to crystallize.

(c) *Saponification of methyl N,N'-ditrityl-L-histidyl-L-leucinate.*—The procedure of Example 1(c) is followed, using for the entire quantity of crude ester obtained 10 cc. of a 20% potassium hydroxide solution in methanol and 2 cc. of water; this produces, after acidification, 6.5 g. (or a yield of 86%) of pulverulent N,N'-ditrityl-L-histidyl-L-leucine which, after having been taken up with chloroform and washed with water, becomes oily without any tendency to crystallize.

EXAMPLE 8

*Preparation of L-histidyl-L-leucine by ditritylation of N,N'-ditrityl-L-histidyl-L-leucine*

The procedure of Example 2 is followed, using for 6 g. of crude N,N'-ditritylated peptide obtained according to 7(c), 20 cc. of 50% aqueous acetic acid. 2 g. (or a yield of 93%) of L-histidyl-L-leucine are obtained, which is identical with the product described by Holley and Sondheimer (J. Am. Chem. Soc. 1954, 76, 1326).

It will be obvious from the foregoing that other amino acids or amino esters may be used as starting materials, or that different solvents may be employed in the process, without exceeding the scope of the invention, as set forth in the appended claims.

We claim:

1. In a process of preparing peptides, the steps which comprise mixing a lower alkyl ester of an acid selected from the group consisting of α-amino carboxylic acids and peptides having free amino groups with an N-tritylated α-amino carboxylic acid selected from the group consisting of methionine, histidine, and tryptophane in solution in halogenated solvent selected from the group consisting of methylene chloride and chloroform in the presence of dicyclohexyl carbodiimide, at a temperature of about 0 C., allowing the mixture to stand at room temperature until condensation is completed, slightly acidifying the reaction mixture with acetic acid to cause decomposition of unreacted dicyclohexyl carbodiimide to dicyclohexyl urea, filtering off precipitated dicyclohexyl urea, washing the filtered solvent solution with hydrochloric acid, ammonia, and water, evaporating to dryness the washed and dried solution, heating under reflux the evaporation residue in a methanolic alkali metal hydroxide solution to cause saponification of the ester group of the resulting N-trityl peptide ester, and heating the N-tritylated peptide with about 50% aqueous acetic acid to split off the trityl group, filtering off precipitated triphenyl carbinol, and recovering the detritylated peptide from the solution.

2. The method of preparing DL-methionyl-glycine which comprises reacting ethyl glycinate in the presence of dicyclohexylcarbodiimide in methylene chloride as solvent with N-trityl-DL-methionine, acidifying slightly with acetic acid, separating precipitated dicyclohexylurea, washing the solvent solution with normal hydrochloric acid, dilute ammonia and water, evaporating to dryness, dissolving ethyl N-trityl-DL-methionylglycinate thus obtained in an about 20% solution of potassium hydroxide in methanol, diluting slightly with water, boiling for about five minutes, cooling, diluting further with water, acidifying with acetic acid, separating precipitated N-trityl-DL-methionylglycine, dissolving in about 50% acetic acid, diluting with water, heating several minutes, separating crystallized triphenylcarbinol and recovering the desired compound from the solution.

3. The method of preparing DL-tryptophylglycine which comprises reacting ethyl glycinate in the presence of dicyclohexylcarbodiimide in chloroform as solvent with N-trityl-DL-tryptophane, acidifying slightly with acetic acid, separating precipitated dicyclohexylurea, evaporating to dryness, dissolving ethyl N-trityl-DL-tryptophylglycinate thus obtained in an about 20% solution of potassium hydroxide in methanol, diluting slightly with water, boiling for about five minutes, cooling, diluting further with water, acidifying with acetic acid, separating N-trityl-DL-tryptophylglycine, dissolving in about 50% acetic acid, diluting with water, heating several minutes, separating crystallized triphenylcarbinol and recovering the desired compound from the solution.

4. The method of preparing L-histidylglycine which comprises reacting ethyl glycinate in the presence of dicyclohexylcarbodiimide in methylene chloride as solvent with N,N'-ditrityl-L-histidine, acidifying slightly with acetic acid, separating precipitated dicyclohexylurea, evaporating to dryness, dissolving the ethyl ester of N,N'-ditritylhistidylglycine thus obtained in an about 20% solution of potassium hydroxide in methanol, diluting slightly with water, boiling for about five minutes, cooling, diluting further with water, acidifying with acetic acid, separating N,N'-ditrityl-L-histidylglycine, dissolving in about 50% acetic acid, diluting with water, heating several minutes, separating crystallized triphenylcarbinol and recovering the desired compound from the solution.

5. The method of claim 1, wherein said amino acid ester is methyl L-leucinate and said N-trityl amino acid is N,N'-ditrityl-L-histidine.

6. The group of compounds consisting of the N-trityl peptides of methionine, tryptophane and histidine and lower alkyl esters thereof.

7. N-trityl-DL-methionyl-glycine.

8. N-trityl-DL-tryptophyl-glycine.

9. N,N'-ditrityl-L-histidyl-glycine.

10. N,N'-ditrityl-L-histidyl-L-leucine.

11. Ethyl N-trityl-DL-methionyl-glycinate.

References Cited in the file of this patent

Helferich et al.: Ber. Deut. Chem., vol. 58, pp. 882–886 (1925).

Anson et al.: "Advances in Protein Chem.," vol. 5, pp. 62, 71 (1949).

Vhorana: J. Chem. Soc. (London), vol. 1952, pp. 2081–8.

Sheehan: J. Am. Chem. Soc., pages 1067–68 (1955), vol. 77.

Anson et al.: Adv. in Protein Chemistry, vol. 12, pages 466–8 (1957).